United States Patent [19]

Malzkorn et al.

[11] Patent Number: 4,610,584
[45] Date of Patent: Sep. 9, 1986

[54] HORIZONTAL DRILLING AND MILLING MACHINE HAVING A SPINDLE HEAD WHICH CAN BE ROTATED ABOUT AN AXIS SET AT 45 DEGREES TO THE HORIZONTAL

[75] Inventors: Matthias Malzkorn, Jüchen; Helmut Holz, Monchen-Gladbach, both of Fed. Rep. of Germany

[73] Assignee: Scharmann GmbH & Co., Monchen-Gladbach, Fed. Rep. of Germany

[21] Appl. No.: 707,095

[22] Filed: Mar. 1, 1985

[30] Foreign Application Priority Data

Mar. 2, 1984 [DE] Fed. Rep. of Germany ....... 3407679

[51] Int. Cl.⁴ .............................................. B23C 1/12
[52] U.S. Cl. .................................... 409/211; 74/423; 74/479; 408/88; 408/89; 408/236; 409/201; 409/230; 409/241

[58] Field of Search ............... 409/215, 201, 211, 230, 409/240, 241; 408/46, 88, 89, 236; 29/26 A; 74/423, 479

[56] References Cited

U.S. PATENT DOCUMENTS 3,448,656 6/1969 Böttger et al. ................. 409/240 X
4,378,621 4/1983 Babel ................................ 29/26 A Primary Examiner—Gil Weidenfeld
Assistant Examiner—Steven C. Bishop
Attorney, Agent, or Firm—Becker & Becker, Inc.

[57] ABSTRACT

A horizontal drilling and milling machine having a spindle head which is rotatable about an axis set at 45° relative to the horizontal. In the horizontal and vertical working positions of the spindle sleeve, the spindle head can be arrested via a support housing. In its horizontal working position, the spindle sleeve is rotatably driven exclusively by a spur gear system, and in its vertical working position is rotatably driven with the aid of a bevel gear system.

9 Claims, 4 Drawing Figures

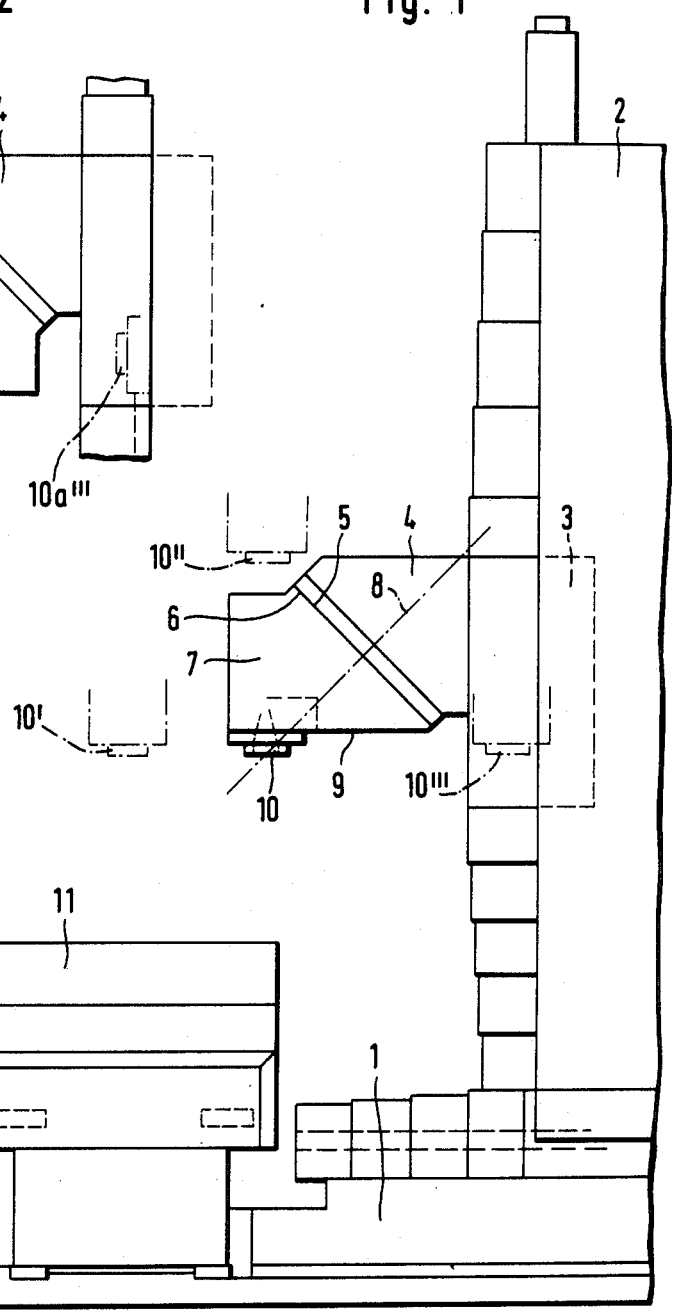
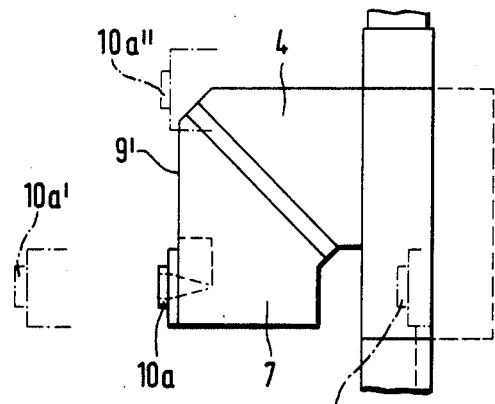

HORIZONTAL DRILLING AND MILLING MACHINE HAVING A SPINDLE HEAD WHICH CAN BE ROTATED ABOUT AN AXIS SET AT 45 DEGREES TO THE HORIZONTAL

BACKGROUND OF THE INVENTION

1. Field of the Invention

The present invention relates to a horizontal drilling and milling machine having a spindle head which can be rotated about an axis set at 45° relative to the horizontal; the spindle head can be arrested by means of a support housing in the horizontal working position and in the vertical working position of the spindle sleeve, and the latter can be driven by means of a bevel gear system.

2. Description of the Prior Art

U.S. Pat. No. 3,083,617 Swanson et al dated Apr. 2, 1963 discloses a horizontal drilling and milling machine having a spindle head which can be rotated about a horizontal axis. In this arrangement, the spindle, within a given vertical plane, can be placed in angularly different working positions.

The drilling and milling machine pursuant to French Pat. No. 1 434 203 provides a split spindle head, one part of which is again rotatable about a horizontal axis and rigidly supports the second part at an angle of 45° relative to the horizontal.

These two heretofore known embodiments do not drill and mill coaxially or parallel to the drive spindle of the housing or headstock which supports the spindle head; instead, the drilling and milling always takes place at right angles to the longitudinal axis of the headstock or housing, and hence at right angles to the drive shaft therein. In this way, the spindle or the spindle sleeve of the spindle head can be driven by a spur gear system.

German Offenlegungsschrift No. 26 13 736, and U.S. Pat. No. 3,448,656 Böttger et al dated June 10, 1969, disclose a horizontal drilling and milling machine of the general type initially mentioned. With these machines, the spindle, in its horizontal operating position, is disposed parallel or coaxial to the drive shaft of the housing which supports the spindle head, or to the headstock which supports this housing. The drive of the spindle is effected for both operating positions by means of a bevel gear system.

An object of the present invention is to improve the horizontal drilling and milling machine of the aforementioned general type in such a way that on the one hand the higher horizontal drilling speed relative to the speed when the spindle is in the vertical position is taken into account to the same extent as is increased development of heat and noise of a bevel gear system; on the other hand, these requirements are to be satisfied with structurally simple means with at least no greater wear than was previously the case.

BRIEF DESCRIPTION OF THE DRAWINGS

This object, and other objects and advantages of the present invention, will appear more clearly from the following specification in conjunction with the accompanying drawings, in which:

FIG. 1 illustrates one embodiment of the inventive horizontal drilling and milling machine, with the support, the headstock, and the spindle head with its spindle sleeve being in various vertical operating positions;

FIG. 2 shows the spindle head and its spindle sleeve in various horizontal positions;

SUMMARY OF THE INVENTION

Figure 3:
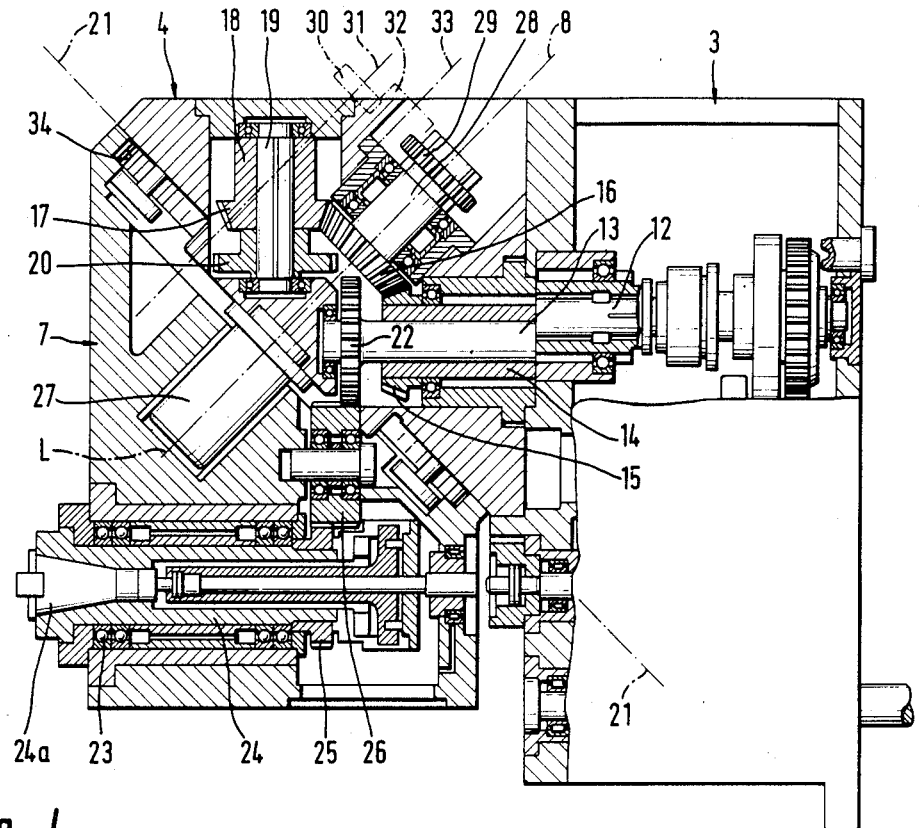
FIG. 3 is a vertical section through the support housing and the spindle head, showing the spindle sleeve in its horizontal end position.

The horizontal drilling and milling machine of the present invention is characterized primarily in that the spindle sleeve, in its horizontal working position, is rotatably driven exclusively by a spur gear drive system, and in its vertical working position is rotatably driven with the aid of the bevel gear system.

Pursuant to further improvements and specific embodiments of the present invention, that end of the drive shaft in the support housing for the spindle sleeve which faces the spindle head may rigidly support a spur gear, as well as a bevel gear which is disposed in the vicinity of the spur gear. The entire bevel gear system may be disposed in the support housing. On the other hand, the spur gear system for the spindle sleeve is essentially disposed in the spindle head.

The last bevel gear of the bevel gear system may be coaxially and rigidly connected with a spur gear which is disposed at least partially in the spindle head. That bevel gear which is disposed between the vertical bevel gear and the horizontal bevel gear of the bevel gear system in this support housing, may be disposed in the axis of rotation of the spindle head.

The drive for rotating the spindle head may be derived from the drive shaft of the spindle sleeve. In particular, that middle bevel gear of the bevel gear system which is inclined at an angle of 45° relative to the horizontal, may be rigidly connected with a spur gear which is part of a coupling, the output shaft of which carries the rotary pinion for the spindle head.

The present invention proceeds on the basis that for the two different positions of the spindle, i.e. the vertical and the horizontal working positions, two different drive systems, namely the spur gear system on the one hand, and the bevel gear system on the other hand, are utilized. For the more frequently used horizontal working position of the spindle, the spur gear drive system of the spindle, or of the spindle housing, is used, this system producing less wear and developing less noise and heat. The vertical spindle position of the spindle or spindle housing is taken into account by utilizing a known bevel gear system.

DESCRIPTION OF PREFERRED EMBODIMENTS

Referring now to the drawings in detail, the vertical support 2 can be moved horizontally on the base 1. The height of the headstock 3 is adjustable on the support 1. The front side, namely the left side in FIGS. 1 and 2, of the headstock 3 supports a support housing 4, which is provided with an area of contact 5 which is inclined at an angle of 45° to the horizontal. The spindle head 7 of the drilling and milling machine is provided with an identical area of contact 6; the spindle head 7 can revolve about an axis 8 which is also inclined at an angle of 45° to the horizontal. The spindle head supports the spindle sleeve 10, which projects out of the wall 9 of the spindle head; a tool can be inserted in the free end of the spindle sleeve 10.

Due to the fact that the support 2 can move in a horizontal plane, and that the headstock 3 can move in a vertical plane, the spindle sleeve, in its vertical position, can assume the individual positions 10, 10', 10", 10''', etc. If the spindle head 7 is rotated 180° about the axis 8, so that the wall 9 which initially faced downward moves into the vertical position 9' as shown in FIG. 2, the spindle sleeve assumes the horizontal position 10a, and can also assume the various positions 10a', 10a", 10a''', etc. due to the fact that the carriage and the headstock 3 can be moved. As a result, the nonllustrated work piece, which is clamped to the rotary table 11, can be machined from above and from all sides.

The headstock 3 is provided with a drive shaft 12 which transmits its rotary movement to a shaft 13 in the support housing 4. This shaft 13 supports a sleeve 14 which is rigidly connected thereto. That end of the sleeve 14 which faces the spindle head 7 is provided with a bevel gear 15 which is rigidly connected thereto. A further bevel gear 16 is disposed in the housing 4 in the axis 8 about which the spindle head 7 can rotate. The further bevel gear 16 meshes with a bevel gear 17 which is rigidly connected with a sleeve 18 which, in turn, is rigidly carried by a vertical shaft 19. Also rigidly connected to this shaft 19 is a spur gear 20 which is disposed in or in the vicinity of the interface 21 between the support housing 4 and the spindle head 7.

A spur gear 22 is provided on that end of the shaft 13 which is adjacent to the spindle head 7, and hence is provided in the immediate vicinity of the bevel gear 15. Furthermore, the spindle sleeve 24 is mounted in the spindle head 7 with the aid of the bearing 23. The spindle sleeve 24 rigidly carries a radially-toothed pinion 25, which meshes with a further, similar pinion 26.

Figure 4:
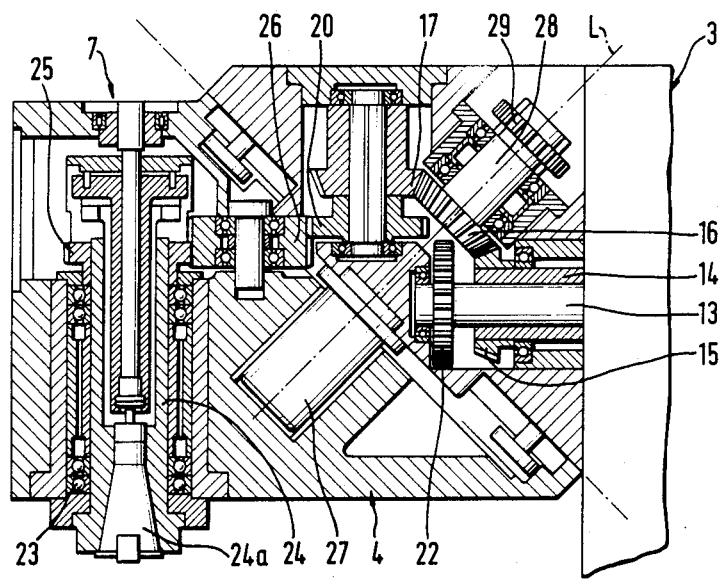
FIG. 4 is a vertical section through the support housing and the spindle head showing a spindle sleeve in its vertical end position.

A comparison of FIGS. 3 and 4 shows the manner of operation and the drive of the spindle sleeve 24, and hence of the tools which are inserted into the tapered socket 24a of the sleeve 24. In the position of the spindle head 7 illustrated in FIG. 3, in which the spindle sleeve 24 assumes a horizontal position, the drive is effected from the shaft 13 via its spur gear 22 onto the pinion 26, and from there via the pinion 25 onto the spindle sleeve 24, into the tapered socket 24a of which the tool can be inserted. In the horizontal operating position of the spindle sleeve 24, the latter is thus driven exclusively by a spur gear system which comprises the gears or pinions 22, 25, 26.

If, after a rotation of 180° relative to the position of FIG. 3, the spindle head 7 is in the position illustrated in FIG. 4, in which a spindle sleeve 24 has a vertical orientation, the drive of the spindle sleeve 24 is effected from the shaft 13 via the bevel gear system 15, 16, 17 onto the spur gear 20, and from there via the two pinions 26, 25 onto the spindle sleeve 24.

For the mounting and rotation of the spindle head 7, the support housing 4 is provided with a supporting journal 27, the longitudinal axis L of which is disposed in the axis 8. The rotary movement of the spindle head 7 about the supporting journal 27 is derived from the shaft 13. For this purpose, a gear 29 is rigidly connected to the shaft 28 which supports the bevel gear 16 (see FIGS. 3 and 4). Associated with the gear 29 at the same level, not at a distance therefrom, is a further gear 30. This further gear 30 is rigidly disposed on a shaft 31 which is disposed beyond the plane of the drawing, and is therefore only illustrated by a dot-dash line. In order to selectively rotate this shaft 31 when the spindle head 7 is to be rotated about the journal 27, a coupling gear 32 is provided which can be thrown into and out of gear with the gears 29, 30 when it is shifted along its shaft 33.

The lower end of the shaft 31, which supports the gear 30, supports a non-illustrated pinion which meshes with the internal toothing 34 of the spindle head 7, so that when the coupling gear 32 is connected, the spindle head 7 is caused to rotate by the spindle drive shaft 13. Suitable means, such as index bolts for a Hirth-type coupling, provide for the precise positioning of the spindle head 7 and for arresting it in each new position.

The present invention is, of course, in no way restricted to the specific disclosure of the specification and drawings, but also encompasses any modifications within the scope of the appended claims.

What we claim is:

1. A horizontal drilling and milling machine, which has a spindle head which can be rotated about an axis set at 45° relative to a horizontal plane; said spindle head, which carries a rotatable spindle sleeve, can be arrested by means of a support housing in horizontal and vertical working positions of said spindle sleeve; said drilling and milling machine further having the improvement therewith which comprises:

drive means arranged to drive said spindle sleeve in a horizontal working position differently at a higher rotating speed during horizontal operation than a lower rotating speed during vertical operation to drive said spindle sleeve in a vertical working position; said drive means including a spur gear system for rotatably driving said spindle sleeve in its horizontal working position at the higher rotating speed; and said drive means also including a bevel gear system for rotatably driving said spindle sleeve in its vertical working position at the lower rotating speed likewise attainable along with said spur gear drive system producing less wear and developing less noise and heat in the more frequently used horizontal working position of said spindle sleeve.

2. A drilling and milling machine according to claim 1, which includes a drive shaft which is rotatably mounted in said support housing; said drive shaft having an end which faces said spindle head; and rigidly connected to said last-mentioned end of said drive shaft there is a first spur gear, which forms part of said spur gear system; and also rigidly connected to said drive shaft, near said first spur gear, there is a first bevel gear, which forms part of said bevel gear system.

3. A horizontal drilling and milling machine, which has a spindle head which can be rotated about an axis set at 45° relative to a horizontal plane; said spindle head, which carries a rotatable spindle sleeve, can be arrested by means of a support housing in vertical and vertical working positions of said spindle sleeve; said drilling and milling machine further comprises:

a spur gear system for rotatably driving said spindle sleeve in its horizontal working position;

a bevel gear system for rotatably driving said spindle sleeve in its vertical working position;

a drive shaft which is rotatably mounted in said support housing; said drive shaft having an end which faces said spindle head; and rigidly connected to said last-mentioned end of said drive shaft there is a first spur gear, which forms part of said spur gear system; and also rigidly connected to said drive shaft, near said first spur gear, there is a first bevel gear, which forms part of said bevel gear system;

a first toothed pinion, which is rigidly connected to said spindle sleeve; a second toothed pinion, which meshes with said first pinion, is rotatably mounted in said spindle head; in said horizontal working position of said spindle sleeve, said second pinion meshes with said first spur gear of said drive shaft, and in said vertical working position of said spindle sleeve, said second pinion meshes with said bevel gear system.

4. A drilling and milling machine according to claim 3, in which said bevel gear system is essentially disposed entirely in said support housing.

5. A drilling and milling machine according to claim 4, in which said spur gear system is essentially disposed in said spindle head.

6. A drilling and milling machine according to claim 3, in which said drive shaft is horizontally mounted in said support housing; which includes a further shaft, which is vertically and rotatably mounted in said support housing; in which a second bevel gear is rigidly connected to said further shaft, said second bevel gear being drivingly connected with said first bevel gear; and in which a second spur gear is also rigidly connected to said further shaft; in said vertical working position of said spindle sleeve, said second spur gear meshes with said second pinion of said spindle head.

7. A drilling and milling machine according to claim 6, which includes a third bevel gear, which is rotatably mounted in said support housing on said axis of rotation of said spindle head; said third bevel gear effects said driving connection between said first and second bevel gears.

8. A drilling and milling machine according to claim 7, which includes a drive mechanism for rotating said spindle head; said drive mechanism derives its motive power from said drive shaft for said spindle sleeve.

9. A drilling and milling machine according to claim 8, which includes another shaft rotatably mounted in said support housing on said axis of rotation of said spindle head, and thus at 45° relative to a horizontal plane; said third bevel gear, and a third spur gear, are rigidly connected to said another shaft; also provided is a coupling which has an output shaft for effecting said rotation of said spindle head; said output shaft is provided with a rotary pinion which is rigidly connected thereto, and can be drivingly connected with said third spur gear.

* * * * *